United States Patent [19]
Crump et al.

[11] Patent Number: 4,468,252
[45] Date of Patent: Aug. 28, 1984

[54] SET RETARDING ADDITIVES FOR CEMENT FROM AMINOMETHYLENEPHOSPHONIC ACID DERIVATIVES

[75] Inventors: Druce K. Crump; David A. Wilson, both of Freeport, Tex.

[73] Assignee: The Dow Chemical Company, Midland, Mich.

[21] Appl. No.: 500,104

[22] Filed: Jun. 1, 1983

[51] Int. Cl.$^3$ .............................................. C04B 7/35
[52] U.S. Cl. ...................................... 106/90; 106/315
[58] Field of Search .................................. 106/90, 315

[56] References Cited
U.S. PATENT DOCUMENTS

| | | | |
|---|---|---|---|
| 3,346,487 | 10/1967 | Iraul et al. | 252/8.5 |
| 3,346,488 | 10/1967 | Lyons et al. | 252/8.5 |
| 3,409,080 | 11/1968 | Harrison | 166/31 |
| 3,654,151 | 4/1972 | King et al. | 252/8.5 C |
| 3,657,134 | 4/1972 | King et al. | 252/8.5 C |
| 3,794,506 | 2/1974 | Schmidt et al. | 106/90 |
| 3,865,803 | 2/1975 | Falkehag | 260/124 A |
| 3,941,772 | 3/1976 | Ploger et al. | 106/315 |
| 3,964,921 | 6/1976 | Persinski et al. | 106/90 |
| 4,040,854 | 8/1977 | Persinski et al. | 106/90 |
| 4,066,469 | 1/1978 | Shiel et al. | 106/89 |
| 4,225,361 | 9/1980 | Joseph | 106/111 |

OTHER PUBLICATIONS

Chem. Abstracts: 97, 112352a–"Plugging composition for cementing oil and gas wells", Dytyuk, L. T. et al.
Chem. Abstracts: 97, 26178a–"Plugging fluids for cementing deep petroleum and gas wells", Alekseev, P. D. et al.
Chem. Abstracts: 98, 58912p–"Improvement of casing cementation in deep and ultradeep wells. Part 2. Deep well cements and additives." Arens, K. H. et al.

*Primary Examiner*—James Poer

[57] ABSTRACT

Compounds useful as cement set retarding additives have been found which have the formula

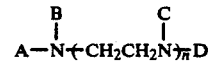

wherein A, B, C and D substituents are independently selected from hydrogen, methylenephosphonic acid, or salts thereof, hydroxypropyltrialkylammonium halide, wherein the trialkylammonium moiety contains alkyl groups having from 1 to 5 carbon atoms and n is 0 to 15, and wherein said substituents include at least one methylenephosphonic acid group, or salt thereof, and at least one hydroxypropyltrialkylammonium halide group.

20 Claims, No Drawings

SET RETARDING ADDITIVES FOR CEMENT FROM AMINOMETHYLENEPHOSPHONIC ACID DERIVATIVES

BACKGROUND OF THE INVENTION

Hydrophobic-substituted phosphonic or phosphinic acids and their alkali metal salts have been used in cements, primarily soil/cement mixtures, to improve the freeze-thaw properties and salt-resistance. Six- to eighteen-carbon alkyl phosphonic acids or their alkali metal salts are so described in U.S. Pat. No. 3,794,506. A plugging mixture for high temperature oil and gas wells comprising Portland cement and 1-hydroxy ethylidenephosphonic acid trisodium or tripotassium salts as set time extenders is described in Derwent abstract 71376B/39 (1979) of USSR Pat. No. 640,019. The use of these phosphonate salts at temperatures of 75° to 150° C. in amounts of 0.1–0.3% by weight is described in the abstract.

Other organic phosphorous acid derivatives are taught to be useful additives in cement compositions as turbulence-inducing and flow-property improver additives (U.S. Pat. Nos. 3,964,921 and 4,040,854, respectively). Another turbulence-inducer is a pyrolysis product of urea and a bis(alkylenepyrophosphate) (U.S. Pat. No. 3,409,080).

Alkylene diphosphonic acids and their water soluble salts are described as set time extenders and water reducing agents for gypsum plasters (U.S. Pat. No. 4,225,361). Lignins which have been phosphonoalkylated through an ether linkage or corresponding sulfonates, sulfides, hydroxyl or amine derivatives are taught to be useful primarily as dispersants or surfactants (U.S. Pat. No. 3,865,803) and are also said to be useful as "cement additives" without indicating specific uses.

Ultra-rapid hardening Portland cement compositions are described which contain various acid salt additives (U.S. Pat. No. 4,066,469). It states that use of acid phosphates as the acid salt additives is excluded since the phosphates have a characteristically powerful retarding property peculiar to them.

Most of the cement used in oil wells is called portland cement. Portland cement is manufactured by calcining raw materials consisting of limestone, clay, shale, and slag together at 2,600° to 2,800° F. in a rotary kiln.

The resulting material, is cooled and interground with small percentages of gypsum to form portland cement. In addition to the above raw materials, other components such as sand, bauxite, iron oxide, etc., may be added to adjust the chemical composition depending upon the type of portland cement desired.

The principal components of the finished portland cement are lime, silica, alumina, and iron. These components form the following complex compounds: Tricalcium aluminate, $(3CaO.Al_2O_3)$, tetracalcium aluminoferrite, $(4CaO.Al_2O_3.Fe_2O_3)$, tricalcium silicate, $(3CaO.SiO_2)$, and dicalcium silicate, $(2CaO.SiO_2)$.

When water is added to cement, setting and hardening reactions begin immediately. The chemical compounds in the cement undergo the processes of hydration and recrystallization which results in a set product. The maximum amount of water that can be used with an oil-well cement is the amount which can be added before solids separation occurs. The minimum amount of water is the amount required to make the slurry pumpable. Therefore, the normal water ratio is governed by the maximum and minimum limits for a particular class of cement.

Thickening time is the time that the cement remains pumpable in the well. This is the most critical property of an oil-well cement. The thickening time has to be long enough to be pumped into place and short enough to permit operations to resume quickly. Generally, 3 hours provides the necessary placement time plus a safety factor.

Other factors, such as fluid loss, viscosity and density must be taken into consideration and additives are known to the art-skilled which affect each of these factors as well as that of set, or thickening, time as mentioned above. Another parameter which has an effect on set time is temperature. Cement sets more rapidly as the temperature increases. This must be taken into consideration particularly when pumping cement into deeper wells since temperature increases as the depth of the well becomes greater. Temperature also affects the strength of the cement, the strength becoming less as the temperature increases.

Because of this temperature effect, it is important to retard the setting of the cement employed in the deeper wells.

It has now been discovered that certain new phosphonomethylated compounds containing quaternary ammonium groups are useful in aqueous cement slurries as set retarding additives. These compounds and their preparation, have been disclosed in a copending application entitled "New Compounds Containing Quaternary Ammonium and Methylenephosphonic Acid Groups", Ser. No. 489,442, filed Apr. 28, 1983.

SUMMARY OF THE INVENTION

The compounds useful as cement set retarders in aqueous cement slurries are methylene phosphonic acid derivatives having the following formula:

wherein A, B, C and D substituents are independently selected from hydrogen, methylenephosphonic acid, or salts thereof, hydroxypropyltrialkylammonium halide, wherein the trialkylammonium moiety contains alkyl groups having from 1 to 5 carbon atoms and n is 0 to 15, and wherein said substituents include at least one methylenephosphonic acid group, or salt thereof, and at least one hydroxypropyltrialkylammonium halide group.

DETAILED DESCRIPTION OF THE INVENTION

The compounds useful in the present invention are substituted ammonia and amines in which at least one of the amine hydrogens is substituted with a methylenephosphonic acid group or salts thereof and at least one with a quaternary ammonium radical.

It has now been discovered that such a functionality when attached to a diamine or polyamine which also contains a methylenephosphonic acid group will when added to an aqueous cement slurry retard the setting of the cement.

The following describes a typical preparation of the compounds useful in the present invention.

Ethylenediamine (EDA) (15 g, 0.25 mole) and 94 g (0.25 mole) of a 50% aqueous solution of 3-chloro-2- hydroxypropyltrimethylammonium chloride were added to a 500 ml round-bottom reaction flask equipped with a water-cooled reflux condenser, mechanical stirrer, thermometer with a temperature controller, and an addition funnel. The reaction mixture was heated to 90° C. and digested for about one hour and cooled. Approximately 60 g of concentrated hydrochloric acid solution and 67.5 g (0.82 mole) of phosphorus acid were added to the reaction flask and heated to reflux and maintained for one hour. Aqueous 37% formaldehyde solution (67.4 g, 0.83 mole) was weighed into the addition funnel and added over a two-hour period. The reaction mixture was heated at reflux for an additional three hours and then cooled. The product was the derivative of EDA in which one hydrogen had been replaced with a 2-hydroxypropyltrimethylammonium chloride group and the remaining hydrogens with methylenephosphonic acid groups. Further description can be found in the above-mentioned copending application.

The above and other related compounds were determined to be useful as cement retarders by employing the following test.

1. The following ingredients were weighed:
   cement—100 g
   water—38 g
   additive—0.2 g active
2. Water and liquid additive were mixed;
3. Cement was added to liquid, the bottle tightly closed and shaken to mix;
4. Bottle was placed in a pre-heated 180° F. bath;
5. Setting of cement was checked after 6 and 24 hours.

A blank (no additive) was run for comparison with each of the additives.

The compounds listed in Table I were prepared and tested using the above procedure. Results of these tests on retarding cement setting are given in Table II.

TABLE I

| Sample | Derived from | No. of Quat. Groups | No. of MePhos. Groups | Other Groups |
|---|---|---|---|---|
| A | EDA | 1 | 3 | — |
| B | EDA | 2 | 2 | — |
| C | DETA | 1 | 3 | 1 (acetic) —CH₂COOH |
| D | NH₃ | 1 | 2 | — |
| E | E-100* | 5 mole % | 95 mole % | — |
| F | E-100 | 10 mole % | 90 mole % | — |
| G | E-100 | 15 mole % | 85 mole % | — |

*E-100 is a polyamine having an average molecular weight of 250–300, mostly pentaethylenehexamine plus some heavier ethyleneamines.

TABLE II

| | Time of Observation | |
|---|---|---|
| Sample* | 6 hrs. | 24 hrs. |
| A | retarding, not set | retarding, not set |
| B | retarding, not set | retarding, not set |
| C | retarding, not set | retarding, not set |
| D | retarding, not set | retarding, not set |
| E | retarding, not set | retarding, not set |
| F | retarding, not set | retarding, not set |
| G | retarding, not set | retarding, not set |

*Sample designations are the same as in Table I. A blank run without any additive was set by 6 hours.

We claim:

1. In a process for retarding the setting of an aqueous cement slurry which comprises adding to said slurry an organic phosphonate, the improvement which comprises employing a compound of the formula

wherein the A, B, C and D substituents are independently selected from the group consisting of hydrogen, methylenephosphonic acid or salt thereof and 2-hydroxy-3(trialkylammonium halide)propyl wherein each alkyl group has from 1 to 5 carbon atoms, n is 0 to 15, and wherein said substituents include at least one methylenephosphonic acid group, or salt thereof, and at least one 2-hydroxy-3(trialkylammonium halide)propyl group.

2. The process of claim 1 wherein the compound employed has the formula in which n is 0 and A and B are each a methylenephosphonic acid group or its salt.

3. The process of claim 1 wherein the compound employed has the formula in which n is 1 and two of the substituents are methylenephosphonic groups or salts thereof, the remaining two substituents being 2-hydroxy-3(trialkylammonium halide)propyl halide groups.

4. The process of claim 1 wherein the compound employed has the formula in which n is 2 and one of the substituents is a 2-hydroxy-3(trialkylammonium halide)propyl halide, three substituents are methylenephosphonic acid groups or salts thereof and the remaining substituent is an acetic acid group or its salt.

5. The process of claim 1 wherein the compound employed is a polyamine having an average molecular weight of 250–300.

6. The process of claim 3 wherein the compound employed has two methylenephosphonic acid groups and two 2-hydroxy-3(trimethylammonium chloride)propyl groups as its substitutents.

7. The process of claim 1 wherein the compound employed has the formula in which n is 1 and the substituents are one 2-hydroxy-3(trialkylammonium halide)propyl halide group and three methylenephosphonic acid groups or a salt thereof.

8. The process of claim 7 wherein three of the substituents are methylenephosphonic acid group and the remaining one a 2-hydroxy-3(trimethylammonium chloride)propyl.

9. The process of claim 2 wherein two of the substituent groups are methylenephosphonic acid and the third is 2-hydroxy-3(trimethylammonium chloride)propyl.

10. The process of claim 5 wherein 5 mole percent of the substituent groups are 2-hydroxy-3(trialkylammonium halide)propyl halide groups and the remainder methylenephosphonic acid groups or a salt thereof.

11. The process of claim 5 wherein 10 mole percent of the substituent groups are 2-hydroxy-3(trialkylammonium halide)propyl halide groups and the remainder methylenephosphonic acid groups or a salt thereof.

12. The process of claim 5 wherein 15 mole percent of the substituent groups are 2-hydroxy-3(trialkylammonium halide)propyl halide groups and the remainder methylenephosphonic acid groups or a salt thereof.

13. The process of claim 4 in which one substituent is a 2-hydroxy-3(trimethylammonium chloride)propyl group, one is an acetic group and three are methylenephosphonic acid groups.

14. The process of claim 4 wherein the substituent acid groups are in the form of the alkali metal or alkaline acetic and phosphoric earth metal salt.

15. The process of claim 10 wherein the substituent acid groups are in the form of the alkali metal or phosphoric alkaline earth metal salt.

16. The process of claim 11 wherein the substituent acid groups are in the form of the alkali metal or alkaline earth metal salt.

17. The process of claim 12 wherein the substituent acid groups are in the form of the alkali metal or alkaline earth metal salt.

18. The process of claim 14 wherein the alkali metal salt is the sodium salt.

19. The process of claim 15 wherein the alkali metal salt is the sodium salt.

20. The process of claim 16 wherein the alkali metal salt is the sodium salt.

* * * * *

UNITED STATES PATENT AND TRADEMARK OFFICE
CERTIFICATE OF CORRECTION

PATENT NO. : 4,468,252      Page 1 of 2
DATED : August 28, 1984
INVENTOR(S) : Druce K. Crump and David A. Wilson It is certified that error appears in the above—identified patent and that said Letters Patent is hereby corrected as shown below:

Title page:

Next to last line of the Abstract, delete the word "hydroxypropyltrialkylammonium halide" and insert --2-hydroxy-3(trialkylammonium halide)propyl--.

Col. 4, line 5 of Claim 3, delete the word "halide" at the end of the line.

Col. 4, line 4 of Claim 4, delete the word "halide".

Col. 4, line 4 of Claim 6, delete "substitutents" and insert --substituents--.

Col. 4, line 4 of Claim 7, delete the word "halide".

Col. 4, line 3 of Claim 10, delete the word "halide" before the word "groups".

Col. 4, line 3 of Claim 11, delete the word "halide" before the word "groups".

Col. 4, line 3 of Claim 12, delete the word "halide" before the word "groups".

UNITED STATES PATENT AND TRADEMARK OFFICE
CERTIFICATE OF CORRECTION

PATENT NO. : 4,468,252
DATED : August 28, 1984
INVENTOR(S) : Druce K. Crump and David A. Wilson It is certified that error appears in the above—identified patent and that said Letters Patent is hereby corrected as shown below:

Col. 5, line 3 of Claim 13, insert the word --acid-- between the words "acetic" and "group".

Col. 5, line 3 of Claim 14, delete the words "acetic and phosphoric".

Col. 5, lines 2-3 of Claim 15, delete the word "phosphoric".

Signed and Sealed this

Thirtieth Day of April 1985

[SEAL]

Attest:

DONALD J. QUIGG

Attesting Officer    Acting Commissioner of Patents and Trademarks